US009058049B2

(12) United States Patent
Pons et al.

(10) Patent No.: US 9,058,049 B2
(45) Date of Patent: Jun. 16, 2015

(54) MODULAR LOW-POWER UNIT WITH ANALOG SYNCHRONIZATION LOOP USABLE WITH A LOW-DROPOUT REGULATOR

(71) Applicant: ST-Ericsson SA, Plan-les-Quates (CH)

(72) Inventors: Alexandre Pons, Vizille (FR); Gilles Chevalier, Montbonnot Saint Martin (FR)

(73) Assignee: ST-ERICSSON SA, Plan-Les-Ouates (CH)

( * ) Notice: Subject to any disclaimer, the term of this patent is extended or adjusted under 35 U.S.C. 154(b) by 127 days.

(21) Appl. No.: 13/865,494

(22) Filed: Apr. 18, 2013

(65) Prior Publication Data

US 2014/0070782 A1 Mar. 13, 2014

Related U.S. Application Data

(60) Provisional application No. 61/709,235, filed on Oct. 3, 2012.

(30) Foreign Application Priority Data

Sep. 11, 2012 (EP) .................................... 12306097

(51) Int. Cl.

| | |
|---|---|
| ***G05F 1/00*** | (2006.01) |
| ***H02H 7/00*** | (2006.01) |
| ***H02H 9/00*** | (2006.01) |
| ***G05F 1/46*** | (2006.01) |
| ***G05F 1/565*** | (2006.01) |

(52) U.S. Cl.
CPC . *G05F 1/46* (2013.01); *G05F 1/565* (2013.01)

(58) Field of Classification Search
USPC ......... 323/241, 268, 269, 271–274, 280, 283, 323/284; 361/18; 363/147
See application file for complete search history.

(56) References Cited

U.S. PATENT DOCUMENTS 5,280,455 A 1/1994 Kanaishi
6,963,460 B2 * 11/2005 Jain et al. ........................ 360/46

(Continued)

FOREIGN PATENT DOCUMENTS

EP 1 743 415 A2 1/2007
EP 2 354 881 A1 8/2011

(Continued)

OTHER PUBLICATIONS

International Search Report in corresponding International Application No. PCT/EP2013/068393 mailed Nov. 25, 2013.

(Continued)

*Primary Examiner* — Adolf Berhane
*Assistant Examiner* — Gary Nash
(74) *Attorney, Agent, or Firm* — Patent Portfolio Builders PLLC

(57) ABSTRACT

A low-power-mode unit connected in parallel with a low-dropout regulator to provide a low-power mode includes a power P-MOS transistor, a differential amplifier, and an analog synchronization loop. The analog synchronization loop is configured to add a variable voltage offset depending on a total current at the output such that, in a high-power mode, the low-power unit current flowing through the P-MOS transistor is not zero, while being substantially smaller than the low-dropout regulator current flowing through the low-dropout regulator, and smaller than a predetermined value.

25 Claims, 12 Drawing Sheets

300

(56) References Cited

U.S. PATENT DOCUMENTS

| | | | | |
|---|---|---|---|---|
| 7,084,612 | B2 | 8/2006 | Zinn | |
| 7,411,376 | B2 * | 8/2008 | Zhang | 323/277 |
| 7,646,574 | B2 * | 1/2010 | Imura | 361/93.1 |
| 7,847,530 | B2 * | 12/2010 | Takagi | 323/280 |
| 8,072,196 | B1 | 12/2011 | Li | |
| 8,190,215 | B2 | 5/2012 | Veselic | |
| 2002/0121883 | A1 * | 9/2002 | Bartenschlager et al. | 323/269 |
| 2002/0149036 | A1 | 10/2002 | Yabe | |
| 2003/0147193 | A1 * | 8/2003 | Hamon et al. | 361/87 |
| 2008/0191670 | A1 * | 8/2008 | Oddoart et al. | 323/273 |
| 2010/0213909 | A1 | 8/2010 | Nakashimo | |
| 2011/0193538 | A1 | 8/2011 | Arigliano | |
| 2011/0199750 | A1 | 8/2011 | Veselic | |

FOREIGN PATENT DOCUMENTS

| | | | |
|---|---|---|---|
| EP | 2 372 485 | A1 | 10/2011 |
| WO | 02/057863 | A1 | 7/2002 |
| WO | 2005/112240 | A2 | 11/2005 |

OTHER PUBLICATIONS

Written Opinion of the International Searching Authority corresponding International Application No. PCT/EP2013/068393 mailed Nov. 25, 2013.

* cited by examiner

300

MODULAR LOW-POWER UNIT WITH ANALOG SYNCHRONIZATION LOOP USABLE WITH A LOW-DROPOUT REGULATOR

CROSS REFERENCE TO RELATED APPLICATIONS

This application claims priority and benefit from EP Patent Application No. 12306097.2 filed on Sep. 11, 2012, and U.S. Provisional Application No. 61/709,235 filed on Oct. 3, 2012, the entire contents of which are incorporated in their entirety herein by reference.

TECHNICAL FIELD

Embodiments of the subject matter disclosed herein generally relate to devices and methods for connecting one or more modular low-power units to a low-dropout regulator to efficiently provide a high-power mode and a low-power mode.

BACKGROUND

Low-dropout (LDO) regulators are DC linear voltage regulator (i.e., devices used to maintain a constant output voltage) configured to operate with a very small input-output differential voltage. The advantages of LDO regulators include low minimum operating voltage, high-efficiency operation and low heat dissipation.

As schematically illustrated in FIG. 1, the main components of an LDO regulator 100 are (A) a power field effect transistor (FET) 110 connected between an input line 120 ($V_{IN}$) and an output line 130 ($V_{OUT}$), and (B) a differential amplifier (error amplifier) 140. The power FET 110 is a transistor that uses an electric field to control the shape and, hence, the conductivity of a channel of one type of charge carrier (n for electrons and p for holes) in a semiconductor material. In other words, conductivity across the power FET's source and drain terminals is variable, depending on a signal applied on a gate terminal of the power FET. The FET transistors may have a metal-oxide-semiconductor (MOS) structure.

One input of the differential amplifier 140 receives feedback which is a fraction of the output, and another input of the differential amplifier 140 receives a stable voltage reference (known as "bandgap reference") ($V_{REF}$). If the output voltage ($V_{OUT}$) rises too high relative to the reference voltage ($V_{REF}$), the signal applied to the gate terminal of the power FET 110 changes to maintain a constant output voltage ($V_{OUT}$).

LDO regulators are used in many devices. For example, sources including LDO regulators configured as integrated circuits (IC) can be found in wireless devices such as mobile terminal systems (e.g., cell phones, smartphones, etc.), digital media players (e.g., MP3s and MP4s), DVD players, portable PCs, tablets, etc. Since these devices are often in a "standby" state to reduce power usage and prolong device battery life, it is advantageous to be able to operate these sources in low-power mode (LPM) in addition to their regular manner of operation in high-power mode (HPM). An example would be sources including LDO regulators, such as those used in smartphones, where they provide several mA of output current and consume a few hundred μA in HPM. In LPM, it is desirable for the source to maintain the output voltage for a lower source load, while the source's current (power) consumption is as low as possible (i.e., significantly lower than HPM).

FIG. 2 illustrates a layout of a conventional source 200 including an LDO regulator. The source input 210 and the source output 220 are arranged on the same side (bottom in FIG. 2) and the control loop 240 of the LDO regulator (which includes the differential amplifier) is arranged on the opposite side (upper side in FIG. 2). The LDO regulator's power transistor 230 occupies a middle portion. Input and output lines may extend from the source input 210 and the source output 220 over the power MOS transistor 230.

Two possible approaches for providing LPM are described below, but these have not necessarily been previously conceived or pursued. Therefore, unless otherwise indicated, these approaches are not prior art to the claims in this application and are not admitted to be prior art by inclusion in this section.

A first approach is de-biasing the LDO circuit providing HPM. As suggested in FIG. 1, some components of the LDO regulator 100 (indicated by dashed arrows converging to the "LPM" label) are varied to have different values in LPM than in HPM. The varied components are the current mirror 150, the sampling resistor 160, resistor 170 and differential amplifier 180 (used as a buffer, having gain 1 and low output impedance), etc. This approach is optimized in terms of circuit area reusing the LDO regulator, but has some inherent drawbacks. For instance, the approach is not flexible, and requires major modifications to replace the fixed elements with variable elements and to provide mechanisms for switching between HPM and LPM. Additionally, power consumption in LPM remains significant. A de-biased LDO still has the same structure in LPM as in HPM, and so usually includes several gain stages and a buffering stage resulting in relatively high LPM current (power) consumption.

A second approach employs a dedicated circuit (independent from the LDO regulator used for HPM) to provide LPM. This LPM-dedicated circuit is active in LPM, while being inactive (stopped, turned OFF) in HPM. To manage the LPM/HPM transitions, this solution requires a specific digital control based on delays to create overlapping phases. However, this second approach is also not very flexible because the digital control (in particular, the delays) has to be adapted specifically for each LDO regulator. Additionally, the LPM/HPM transitions managed by the digital control are usually spiky, rather than smooth.

Accordingly, it would be desirable to provide an LPM solution for sources including LDO regulators that avoids the afore-described problems and drawbacks.

SUMMARY

In a source including an LDO regulator used for HPM, a modular low-power (LP) unit including an analog synchronization loop is connected in parallel to the LDO regulator to provide LPM. The LP unit is configured to always be ON (i.e., to have a non-zero current flowing there-through, from the source's input to the source's output). An analog synchronization loop embedded inside the LP unit ensures smooth HPM/LPM transitions, smoother than with any digital control, and limited current through the LP unit in HPM.

According to one exemplary embodiment, there is a low-power-mode integrated circuit (LPMIC) configured to be connected in parallel with a LDO regulator, between a source input and a source output. The LDO regulator is configured (A) to supply a constant output voltage, in HPM, when a load connected to the source output is larger than or equal to a predetermined load value, and (B) to be turned OFF, in LPM, when the load connected to the source output is smaller than the predetermined load value. The LPMIC includes an input connector configured to be connected to the source input, an output connector configured to be connected to the source output, a power P-MOS transistor, a differential amplifier, and an analog synchronization loop. The P-MOS transistor is connected between the input connector and the output connector. The differential amplifier drives the power P-MOS transistor and receives feedback from the output connector as a first input and a reference signal as a second input. The analog synchronization loop includes a sync P-MOS transistor, a first P-MOS transistor, a sync resistor and a current mirror. The sync P-MOS transistor has a source terminal connected to the input connector, and a gate terminal connected to a drain terminal and to a first connector of the current mirror, the gate terminal also being connected to a connection between the differential amplifier and a gate terminal of the power P-MOS transistor via the sync resistor. The first P-MOS transistor has a source terminal connected to the input connector, a gate terminal connected to the connection between the differential amplifier and the gate terminal of the power P-MOS transistor, and a drain terminal connected to a second connector of the current mirror. The current mirror is connected to a ground reference.

According to another exemplary embodiment, there is a method for providing LPM of a source including a LDO regulator connected between a source input and a source output that is configured (A) to supply constant output voltage at the source output in HPM, when a load connected to the source output is larger than or equal to a predetermined load value, and (B) to be turned OFF in LPM when the load connected to the source output is smaller than the predetermined load value. The method includes connecting a LP unit in parallel with the LDO regulator between the source input and the source output. The LP unit includes (1) an input connector configured to connect to the source input, (2) an output connector configured to connect to the source output, (3) a power P-MOS transistor connected between the input connector and the output connector, (4) a differential amplifier driving the power P-MOS transistor, and (5) an analog synchronization loop. The differential amplifier receives feedback from the output connector as a first input and a reference signal as a second input. The analog synchronization loop is configured to add a variable voltage offset to the input connector, the variable offset depending on total current at the source output such that, in HPM, LP current flowing from the input connector to the output connector through the P-MOS is not zero, while being substantially less than an LDO current flowing through the LDO regulator, and less than a predetermined current value. The method further includes operating the LDO regulator and the LP unit in HPM to provide LP current greater than zero, substantially less than the LDO current, and less than the predetermined current value. The method also includes operating the first LP unit in LPM to provide LP current so as to maintain constant output voltage at the source output.

According to another exemplary embodiment, there is a low-dropout-regulator integrated circuit (LDOIC) having an input connector, an output connector, a power MOS transistor connected between the input connector and the output connector, a control circuit configured to drive the power MOS transistor, and a low-power-unit connection area. The low-power-unit connection area is configured to receive at least two LP units to be connected between the input connector and the output connector. The low-power-unit connection area includes sense resistors configured to enable synchronization between two connected LP units to output substantially the same current. Each of the LP unit includes (1) an input connector configured to connect to the source input, (2) an output connector configured to connect to the source output, (3) a power P-MOS transistor connected between the input connector and the output connector, (4) a differential amplifier driving the power P-MOS transistor, (5) an analog synchronization loop and (6) a secondary synchronization loop. The differential amplifier receives feedback from the output connector as a first input and a reference signal as a second input. The analog synchronization loop includes (A) a sync P-MOS transistor, (B) a first P-MOS transistor, and (C) a current mirror. The sync transistor has a source terminal connected to the input connector, and a gate terminal connected to a drain terminal and to a first connector of a current mirror, as well as to a connection between the differential amplifier and a gate terminal of the power P-MOS transistor via a sync resistor. The first P-MOS transistor has a source terminal connected to the input connector, a gate terminal connected to the connection between the differential amplifier and the gate terminal of the power P-MOS transistor, and a drain terminal connected to a second connector of the current mirror. The current mirror is connected to a ground reference. The secondary synchronization loop includes a sensing output, a first sensing input connected to the sensing output, a second sensing input connected to a sensing output of another LP unit, a sense P-MOS, and a secondary differential amplifier. The sense P-MOS transistor has a source terminal connected to the input connector, a gate terminal connected to the connection between the differential amplifier and the gate terminal of the power P-MOS transistor, and a drain terminal connected to the sensing output. The secondary differential amplifier is connected to the first sensing input and to the second sensing input, and has an output terminal connected to the connection between the differential amplifier and the gate terminal of the power P-MOS transistor. One of the sensing resistors in the low-power-unit connection area is connected between the sensing output and the output connector.

According to yet another exemplary embodiment, there is a wireless device including a source having a LDO regulator that is connected between a source input and a source output, and at least one LP unit configured to be connected in parallel with the LDO regulator. The LDO regulator is configured (A) to supply constant output voltage in HPM, when a load connected to the source output is larger than or equal to a predetermined load value, and (B) to be turned OFF in LPM, when the load connected to the source output is smaller than the predetermined load value. The LP unit includes (A) an input connector configured to connect to the source input, (B) an output connector configured to connect to the source output, (C) a power P-MOS connected between the input connector and the output connector, (D) a differential amplifier driving the power P-MOS transistor, and (E) an analog synchronization loop. The differential amplifier receives feedback from the output connector as a first input and a reference signal as a second input. The analog synchronization loop includes a sync P-MOS transistor, a first P-MOS transistor and a current mirror. The sync P-MOS transistor has a source terminal connected to the input connector, a gate terminal connected to a drain terminal and to a first connector of a current mirror, the gate terminal also being connected to a connection between the differential amplifier and a gate terminal of the power P-MOS transistor via a sync resistor. The first P-MOS transistor has a source terminal connected to the input connector, a gate terminal connected to the connection between the differential amplifier and the gate terminal of the power P-MOS transistor, and a drain terminal connected to a second connector of the current mirror. The current mirror is connected to a ground reference.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a source including a LDO regulator.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

Figure 3:
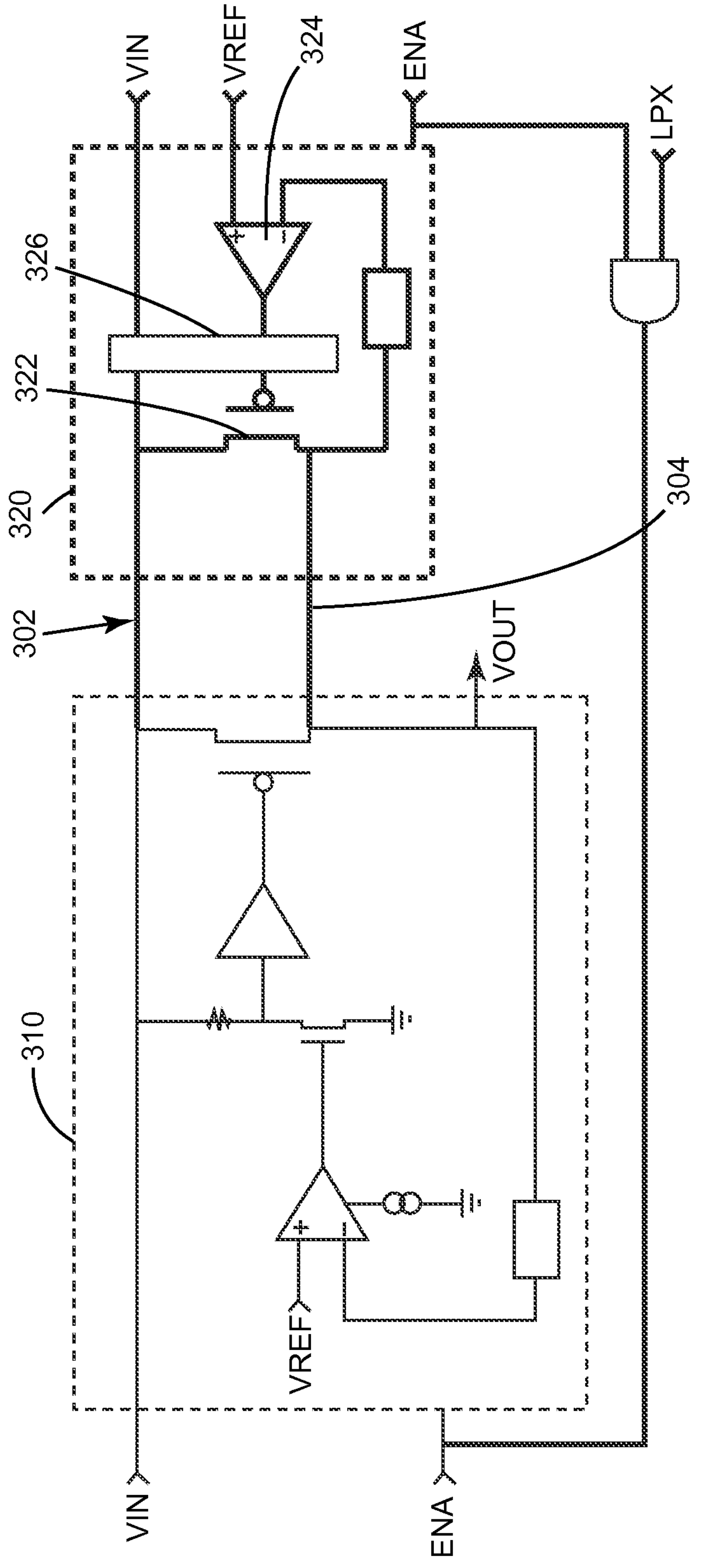
FIG. 3 is a block diagram of a source including an LDO regulator and an LP unit according to an exemplary embodiment.

According to an exemplary embodiment illustrated in FIG. 3, there is a source 300 including an LDO regulator 310 and an LP unit 320 connected in parallel to a source input 302 and a source output 304. The term "source" is used here because the source output 304 is frequently used as a regulated supply to applications. However, in fact, a more accurate term to describe device 300 is a voltage regulator stage of a source or simply "voltage regulator." Thus, the use of the term "source" is intended to be illustrative and practical (shorter) but not limiting. The LDO regulator 310 is configured to supply a constant output voltage in HPM, when a load (not shown) connected to the source output is larger than or equal to a predetermined load value. The LDO regulator 310 is configured to be turned OFF, in LPM, when the load connected to the source output is smaller than the predetermined load value. The LP unit 320 is configured to have a small non-zero current flowing there-through in HPM, and to ensure constant output voltage in LPM. The LDO regulator 310 and the LP unit 320 may receive enabling signals (ENA). Since unlike the LP unit 320, which is ON in both LPM and HPM, the LDO regulator 310 is ON in HPM and OFF in LPM, and its enabling signal may also depend on a load-related signal (LPX).

The LP unit 320 is configured to have a non-zero current passing there-through from the source input 302 to the source output 304 in both HPM and LPM. However, in HPM, the current through the LP unit 320 should be substantially less than the current through the LDO regulator 310. In other words, in HPM, most of the total current from the source input 302 to the source output 304 flows through the LDO regulator 310, while in LPM most of the current from the source input 302 to the source output 304 flows through the LP unit 320.

The LP unit 320 includes a power P-MOS transistor 322, a differential amplifier 324 and a synchronization loop 326 configured to add a variable voltage offset to the LP unit's input connector, the variable offset depending on total current at the source's output. The synchronization loop 326 (which is discussed in detail relative to FIG. 5) operates such that, in HPM, an LP current flowing through the power P-MOS transistor 322 is not zero, while being substantially less than LDO current flowing through the LDO regulator 310, and less than a predetermined current. The synchronization loop 326 ensures smooth (with no spikes) HPM/LPM transitions.

Figure 1:
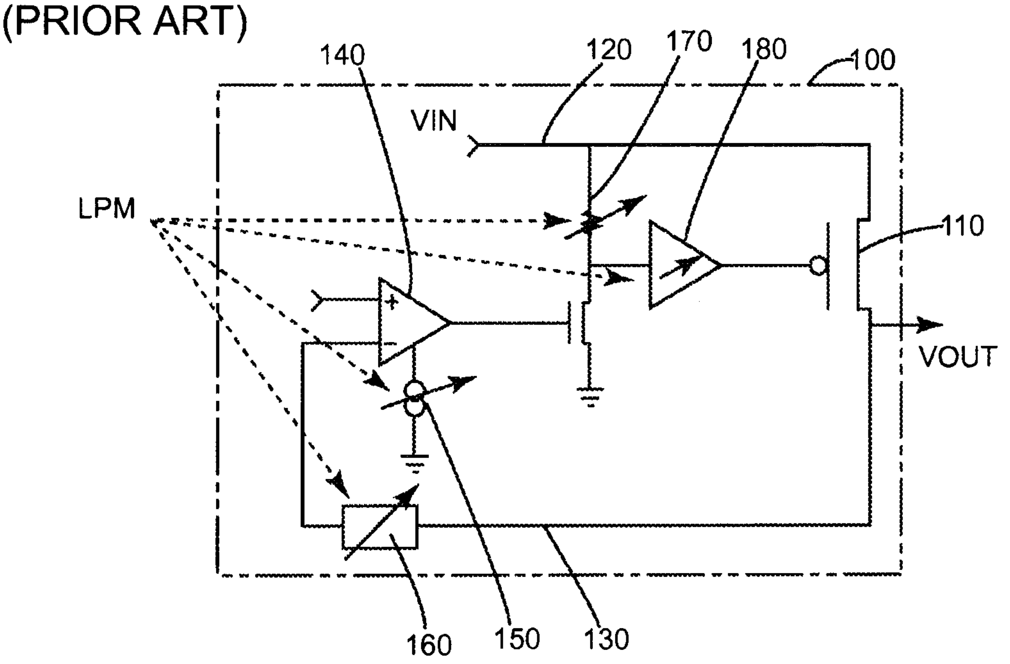
FIGURE 1 (PRIOR ART)
FIG. 1 is a schematic diagram of a conventional source including an LDO regulator.
Figure 2:
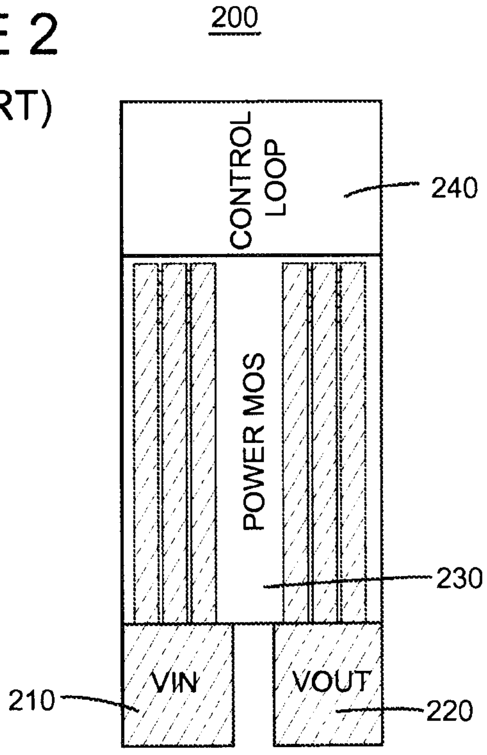
FIGURE 2 (PRIOR ART)
FIG. 2 illustrates a layout of a conventional source including an LDO regulator.
Figure 4:
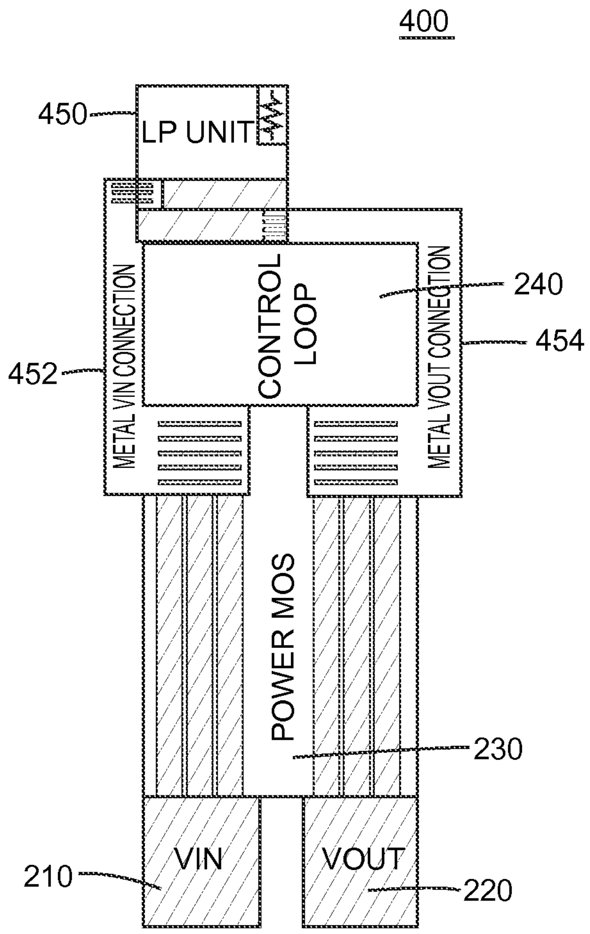
FIG. 4 illustrates a layout of a source including an LDO regulator and an LP unit according to an exemplary embodiment.

FIG. 4 illustrates a layout of a source 400 including an LDO regulator and an LP unit 450. A conventional source including an LDO regulator as illustrated in FIG. 2 may be adapted to connect in parallel the LP unit 450 by placing VIN and $V_{OUT}$ connectors 452 and 454 to the LP unit 450 from the input and output lines extending from the source input 210 and the source output 220, respectively.

Figure 5:
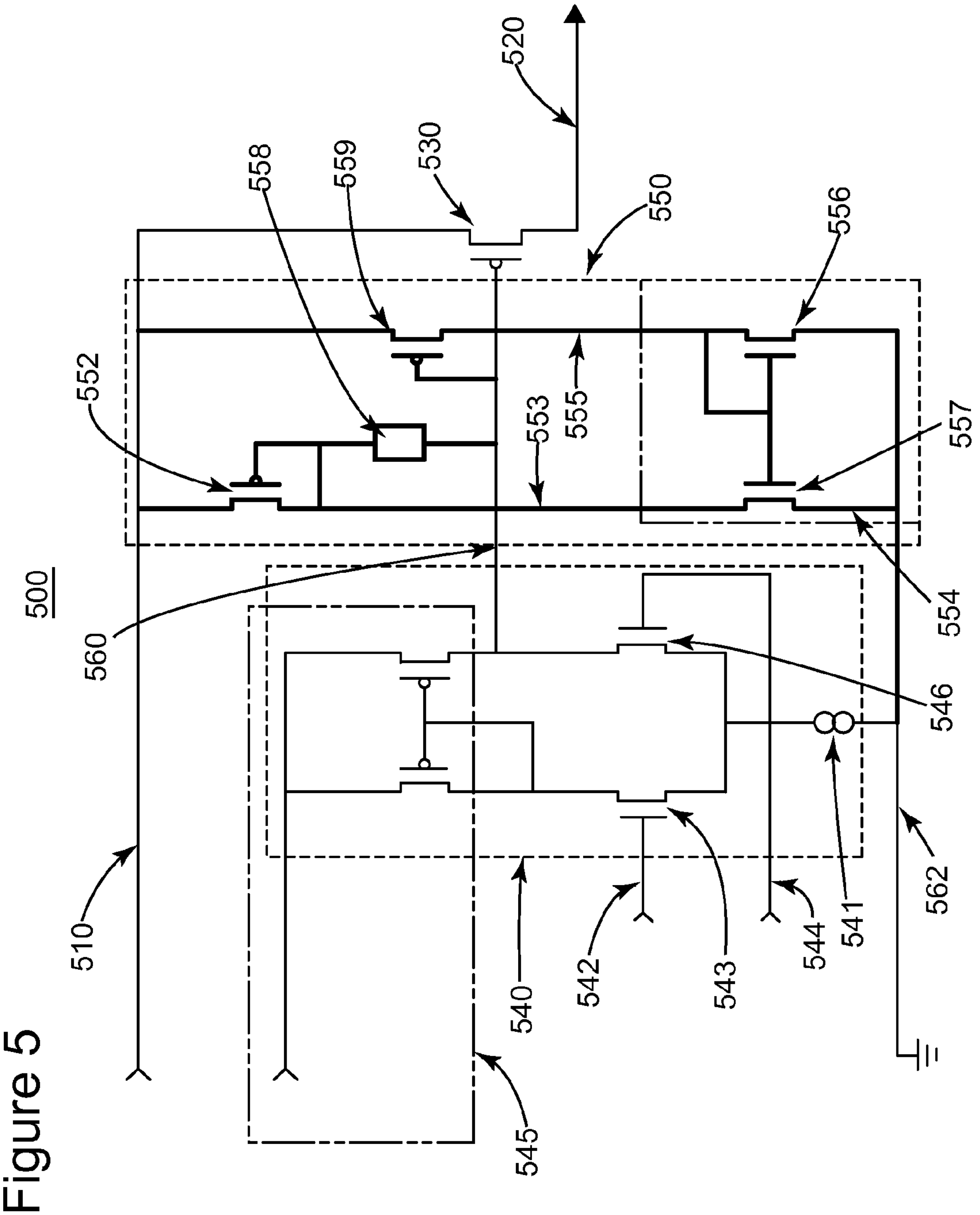
FIG. 5 is a schematic diagram of an LP unit according to an exemplary embodiment.

FIG. 5 is a schematic diagram of an LP unit 500 according to an exemplary embodiment. The LP unit 500 has an input connector 510 configured to connect to the source input 302, and an output connector 520 configured to be connected to the source output 304. A power P-MOS transistor 530 is connected between the input connector 510 and the output connector 520.

The LP unit 500 further includes a differential amplifier 540 that drives the power P-MOS transistor 530 (i.e., the differential amplifier 540 inputs a conductivity control signal to the gate terminal of the power P-MOS transistor 530). The differential amplifier 540 receives feedback from the output connector 520 as a first input 542 and a reference signal ($V_{REF}$) as a second input 544.

The LP unit 500 further includes an analog synchronization loop 550. In order to explain the role of the analog synchronization loop 550, consider first a situation in which this analog synchronization loop 550 was absent. The output voltage Vout of the LDO regulator is:

$$Vout=V_0-K\cdot I_{LDO} \quad (1)$$

where K is load regulation of the LDO regulator (usually in the order of 10 μV/mA), $V_0$ is the LDO output voltage without load, and $I_{LDO}$ is the current flowing through the LDO regulator.

The output voltage vout of the LP unit without the synchronization loop is:

$$vout=V_0-k\cdot I_{UNIT}+\epsilon \tag{2}$$

where k is load regulation of the LP unit and is much higher than for the LDO regulator (e.g., around 100 μV/mA), $I_{UNIT}$ is the current flowing through the LP unit, and ε is a voltage offset between the LDO regulator and the LP unit.

Since the LDO regulator and the LP unit are connected in parallel, Vout=vout and the total current Iout=$I_{UNIT}$+$I_{LDO}$. Using these relationships, the current flowing though the LP unit can be expressed as:

$$I_{UNIT} = \frac{Iout}{1+\frac{k}{K}} + \frac{\varepsilon}{K+k}. \tag{3}$$

The portion of this current depending on ε is the error current $I_{error}$ $$I_{error} = \frac{\varepsilon}{K+k}. \tag{4}$$

The offset ε may create a large error current. For example, the offset ε may fluctuate in a predetermined range, e.g., +/−5 mV, and for a total current Iout=100 mA, $I_{UNIT}$=9 mA+/−40 mA (i.e., the error current $I_{error}$ inside the LP unit being 40 mA). In other words, the current through the LP unit $I_{UNIT}$ could be 0 or +49 mA depending on the offset ε. Thus, in absence of the analog synchronization loop, the performance of the source is unpredictable. Furthermore, the LP unit is designed for low power so that currents passing there-through should be low (e.g., less than 10 mA).

The analog synchronization loop ensures that:

Condition 1: In LPM, most of the total current flows through the LP unit and not through the LDO regulator, the current inside the LP unit never being null, and Condition 2: In HPM, most of the total current flows through the LDO regulator, the current through the LP unit being limited to small values (e.g., less than 10 mA).

The analog synchronization loop adds a variable voltage offset depending on the total current Iout at the input of the LP unit:

$$offset(Iout)=-V_{OS}(Iout)+v_1. \tag{5}$$

A fixed positive shift $v_1$ (e.g., $v_1$=+8 mV) cancels the effect of the offset ε.

When the analog synchronization loop is present, the error current $I_{error}$ is:

$$I_{error} = \frac{\varepsilon - V_{OS}(Iout) + v_1}{K+k} \tag{6}$$

and can be controlled.

The current through the LP unit is then:

$$I_{UNIT} = \frac{1}{K+k}\cdot(K\cdot Iout + \varepsilon - V_{OS}(Iout) + v_1). \tag{7}$$

As illustrated in FIG. 5, the analog synchronization loop 550 includes a sync P-MOS transistor 552, a first P-MOS transistor 559 and a current mirror 554. The transistors 552 and 559 have the same MOS type as the power MOS 530. In view of the fact that power P-MOS transistors are more frequently used than N-MOS type of transistors, a preferred embodiment uses P=MOS transistors. However, N-MOS transistors may also be used in alternative embodiments.

The sync P-MOS transistor 552 has a source terminal connected to the input connector 510, a gate terminal connected to a drain terminal, to a first connector 553 of a current mirror 554, and to a connection 560 between the differential amplifier 540 and a gate terminal of the power P-MOS transistor 530 via a sync resistor 558. Connection 560 is in fact the pathway for modifying conductivity across the source and drain terminals of the P-MOS transistor 530 and, thus, the output current of the LP unit.

The first P-MOS transistor 559 has a source terminal connected to the input connector 510, a gate terminal connected to connection 560, and a drain terminal connected to a second connector 555 of the current mirror 554.

The current mirror 554 is connected to a ground reference 562. The current mirror 554 includes a first N-MOS transistor 556 connected between the second connector 555 of the current mirror 554 and the ground reference 562, and a second N-MOS transistor 557 connected between the first connector 553 of the current mirror 554 and the ground reference 562. A gate terminal of the first N-MOS transistor 556, a gate terminal of the second N-MOS transistor 557, and a source terminal of the second N-MOS transistor 557 are connected together.

The differential amplifier 540 includes a current source 541 connected to the ground reference 562, a first differential amplifier N-MOS transistor 543 and a second differential amplifier N-MOS transistor 546. The first differential amplifier N-MOS transistor 543, which is connected between the current source 541 and an active load 545 of differential amplifier 540, has a gate terminal connected to the first input 542 of the differential amplifier 540, thereby receiving feedback from the output connector 520. The second differential amplifier N-MOS transistor 546, which is connected between the current source 541 and the connection 560 between the differential amplifier 540 and the gate terminal of the power P-MOS transistor 530, has a gate terminal connected to the second input (544) of the differential amplifier 540.

The active load 545 is connected between a drain terminal of the first differential amplifier N-MOS transistor 543 and the connection 562. The active load may consist of two back-to-back (i.e., having their gate terminals connected to each other and to a drain terminal) P-MOS transistors MP1 and MP2 connected to a supply voltage $V_{DD}$ (which may be $V_{IN}$).

Due to the manner in which the analog synchronization loop 550 is connected, $V_{OS}$ is $\Delta V_{GS}$, the variable offset $V_{OS}$ is created by the current $I_{RSYNC}$ flowing from the sync P-MOS transistor 552 (MSYNC) to the connection 560 via $R_{SYNC}$:

$$I_{RSYNC} = \frac{VGS_{M1} - VGS_{MSYNC}}{R_{SYNC}} = \frac{\Delta Vgs}{R_{SYNC}}. \tag{8}$$

The first P-MOS transistor 559 (M1), which has dimensions (α*Wpower, L), generates an image of the output current:

$$I_{M1}=\alpha\cdot I_{OUT}. \quad (9)$$

The first N-MOS transistor 556 (M2) has dimensions (n*w, l) and the second N-MOS transistor 557 (M3) has dimensions (w,l). Due to the current mirror 554, a current $I_{MSYNC}$ flows through the sync P-MOS transistor 552, which has the same dimensions as the first P-MOS transistor 559:

$$I_{MSYNC}=\frac{I_{M1}}{n}=\frac{\alpha\cdot Iout}{n} \quad (10)$$

and $$\Delta Vgs(M_1,M_{SYNC})=\Delta Vgs(\alpha\cdot Iout,n). \quad (11)$$

If the analog synchronization loop 550 were not present, a current $I_b$ would flow through the first differential amplifier N-MOS transistor 543 and the second differential amplifier N-MOS transistor 546 (i.e., MN1 and MN2). When the analog synchronization loop 550 is present, a current through the second differential amplifier N-MOS transistor 546 is:

$$I_{MN2}=I_b+I_{RSYNC}/2. \quad (12)$$

Approximating electrical conductance $G_m$ of MN1 and MN2 as being fixed close to the nominal biasing ($I_{RSYNC}<<I_b$), one can estimate an offset caused by $I_{RSYNC}$ as $$V_{OS}=\frac{I_{RSYNC}}{2G_m}=\frac{\Delta Vgs(\alpha\cdot Iout,n)}{2G_m\cdot R_{SYNC}}. \quad (13)$$

For example, in a source used for a wireless device, the following values may be observed: $I_b$=5 μA, $G_m$=50 μA/V, $1/G_m$=20 mV/μA.

In HPM (i.e., at high $I_{out}$), the power P-MOS transistor 530 (MPOWER), the first P-MOS transistor 559 (M1), and the sync P-MOS transistor 552 (MSYNC) are in saturation:

$$\Delta Vgs(\alpha\cdot Iout,n)\text{ is }\sqrt{2/\beta}\cdot(1-1/\sqrt{n})\cdot\sqrt{\alpha\cdot Iout} \quad (14)$$

and $V_{OS}(I_{out})$ is proportional to $$\frac{\sqrt{I_{out}}}{R_{SYNC}}.$$

In LPM (at low $I_{out}$), the power P-MOS transistor 530 (MPOWER), the first P-MOS transistor 559 (M1), and the sync P-MOS transistor 552 (MSYNC) are in weak inversion:

$$\Delta Vgs\cong\frac{\eta\cdot k\cdot T}{q}\cdot\ln(1/n) \quad (15)$$

and $V_{OS}(I_{out})$ is constant (or rather, it increases slowly).

Figure 6A:
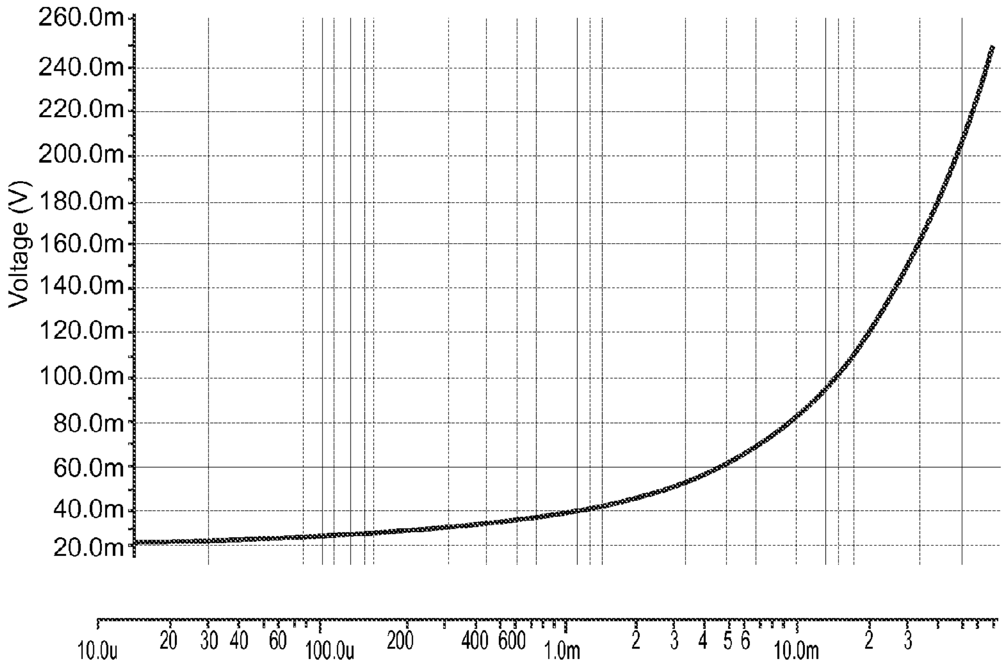
FIGS. 6A and 6B are graphs illustrating the manner of operation of an LP unit according to an exemplary embodiment.
Figure 6B:
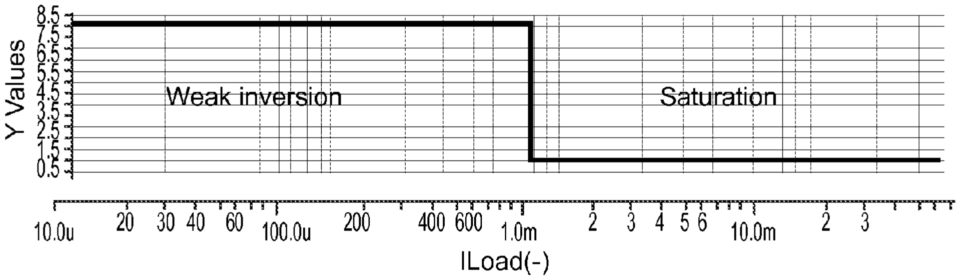

The analog synchronization loop 550 is implemented to take advantage of the low variation of $\Delta V_{GS}$ in weak inversion, and the large square root variation in saturation region. FIGS. 6A and 6B are graphical illustrations of this behavior of the LP unit. The graph in FIG. 6A represents $V_{OS}$ on a linear scale in y-axis versus $I_{out}$ in a logarithmic scale on x-axis. FIG. 6B illustrates the manner of operation of the power P-MOS transistor 530 (MPOWER), the first P-MOS transistor 559 (M1), and the sync P-MOS transistor 552 versus $I_{out}$ in a logarithmic scale on x-axis (as in FIG. 6A). For $I_{out}$ less than 1 mA, $V_{OS}$ varies slowly with $I_{out}$, and the power P-MOS transistor 530 (MPOWER), the first P-MOS transistor 559 (M1), and the sync P-MOS transistor 552 are in weak inversion. For $I_{out}$ larger than 1 mA, $V_{OS}$ varies fast with $I_{out}$, and the power P-MOS transistor 530 (MPOWER), the first P-MOS transistor 559 (M1), and the sync P-MOS transistor 552 are in saturation. The values (voltages and currents) in FIG. 6A are merely exemplary and not intended to be limiting; other values may be appropriate and/or used depending on the applications.

Thus, at low $I_{out}$ (e.g., less than 1 mA), $V_{OS}$ varies very slowly and is small so $\epsilon-V_{OS}(Iout)+v_1>0$ guarantees that current in the LP unit is not zero, thus fulfilling condition 1. Conversely, at high $I_{out}$ (e.g., larger than 1 mA), $V_{OS}$ increases fast, making $\epsilon-V_{OS}(Iout)+v_1$ negative, thereby limiting $I_{UNIT}$ to small values.

In an alternative embodiment, the current mirror 554 may be replaced by a fixed current source. However, in this case the sync loop would generate a variable offset proportional with $V_{GS}$ instead of being proportional with $\Delta V_{GS}$ and therefore it would operate less efficiently than the preferred embodiment with the current mirror (the offset may become too big and the transition between LPM and HPM less smooth).

Figure 7A:
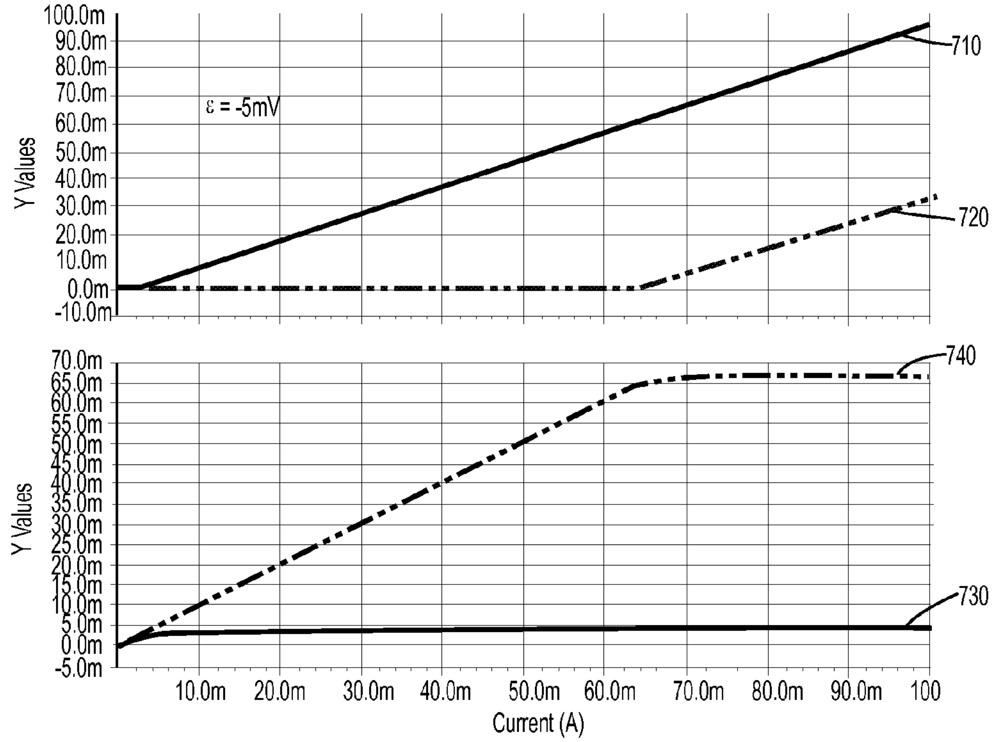
FIGS. 7A and 7B are pairs of graphs illustrating the effect of the analog synchronization loop for two values of the voltage offset $\epsilon$ between an LDO regulator and an LP unit according to an exemplary embodiment.
Figure 7B:
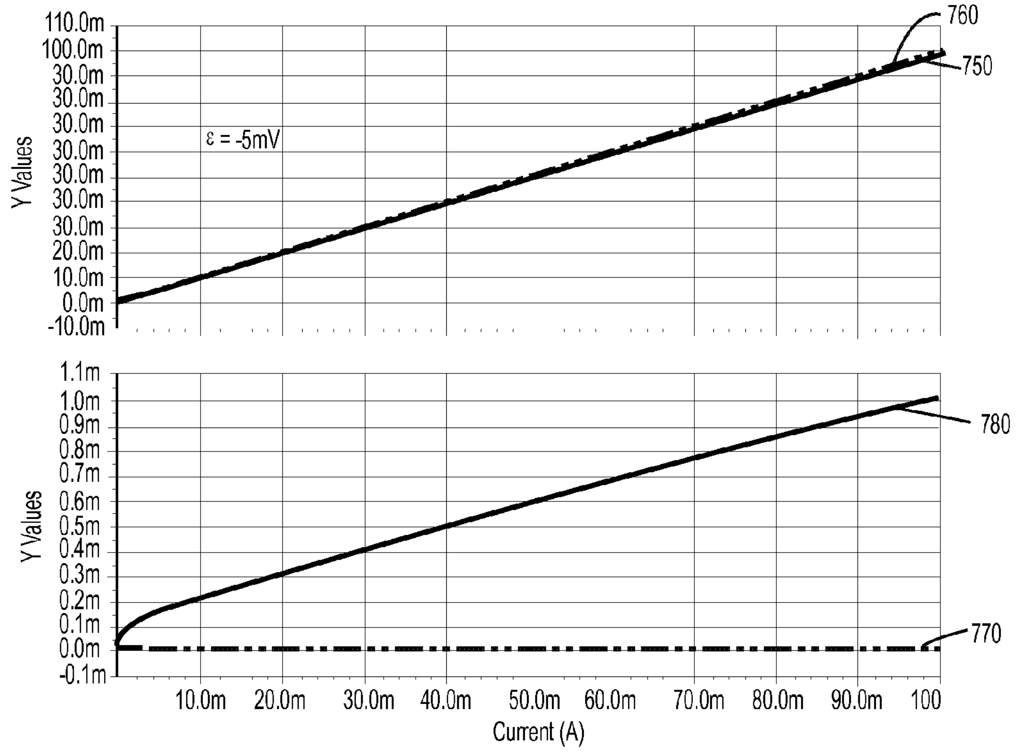

Further, the graphs in FIGS. 7A and 7B illustrate the effect of the analog synchronization loop on the $I_{LDO}$ and $I_{UNIT}$ for two values of the voltage offset ϵ between the LDO regulator and the LP unit: ϵ=+5 mV for the graphs in FIG. 7A, and ϵ=−5 mV for the graphs in FIG. 7B. The x-axis of the graphs in FIGS. 7A and 7B represents the total current $I_{out}$. The y-axis of the upper graphs in FIGS. 7A and 7B represents the current through the LDO regulator, $I_{LDO}$. The y-axis of the lower graphs in FIGS. 7A and 7B represents the current through the LP unit, $I_{UNIT}$.

Continuous line 710 in the upper graph of FIG. 7A illustrates the current through the LDO regulator, $I_{LDO}$, as a function of the total current $I_{out}$ when the analog synchronization loop is present and the voltage offset ϵ between the LDO regulator and the LP unit is ϵ=+5 mV. Dashed line 720 in the upper graph of FIG. 7A illustrates the current through the LDO regulator, $I_{LDO}$, as a function of the total current $I_{out}$ when the analog synchronization loop is not present and for the same voltage offset ϵ=+5 mV. Continuous line 730 in the lower graph of FIG. 7A illustrates the current through the LP unit, $I_{UNIT}$, as a function of the total current $I_{out}$ when the analog synchronization loop is present and the voltage offset ϵ=+5 mV. Dashed line 740 in the lower graph of FIG. 7A illustrates the current through the LP unit, $I_{UNIT}$, as a function of the total current $I_{out}$ when the analog synchronization loop is present for the same voltage offset ϵ=+5 mV.

Continuous line 750 in the upper graph of FIG. 7B illustrates the current through the LDO regulator, $I_{LDO}$, as a function of the total current $I_{out}$ when the analog synchronization loop is present and the voltage offset ϵ is ϵ=−5 mV. Dashed line 760 in the upper graph of FIG. 7B illustrates the current through the LDO regulator, $I_{LDO}$, as a function of the total current $I_{out}$ when the analog synchronization loop is not present for the same voltage offset ϵ=−5 mV. Lines 750 and 760 practically overlap. Continuous line 770 in the lower graph of FIG. 7B illustrates the current through the LP unit, $I_{UNIT}$, as a function of the total current $I_{out}$ when the analog synchronization loop is present and the voltage offset ϵ is ϵ=−5 mV. Dashed line 780 in the lower graph of FIG. 7B illustrates the current through the LP unit, $I_{UNIT}$, as a function of the total current $I_{out}$ when the analog synchronization loop is not present for the same voltage offset ϵ=−5 mV.

Additionally, $v_{out}$ follows a smooth rate of variation influenced by the analog synchronization loop, with the LP unit's output being $$vout=V_0-k\cdot I_{UNIT}+\epsilon-V_{OS}(Iout)+v_1. \quad (16)$$

The LP unit may be modular allowing achievement of larger output currents in LPM, for example, by connecting two or more LP units in parallel to the same LDO regulator. However, in this case, the LP units must be synchronized with one another.

Figure 8:
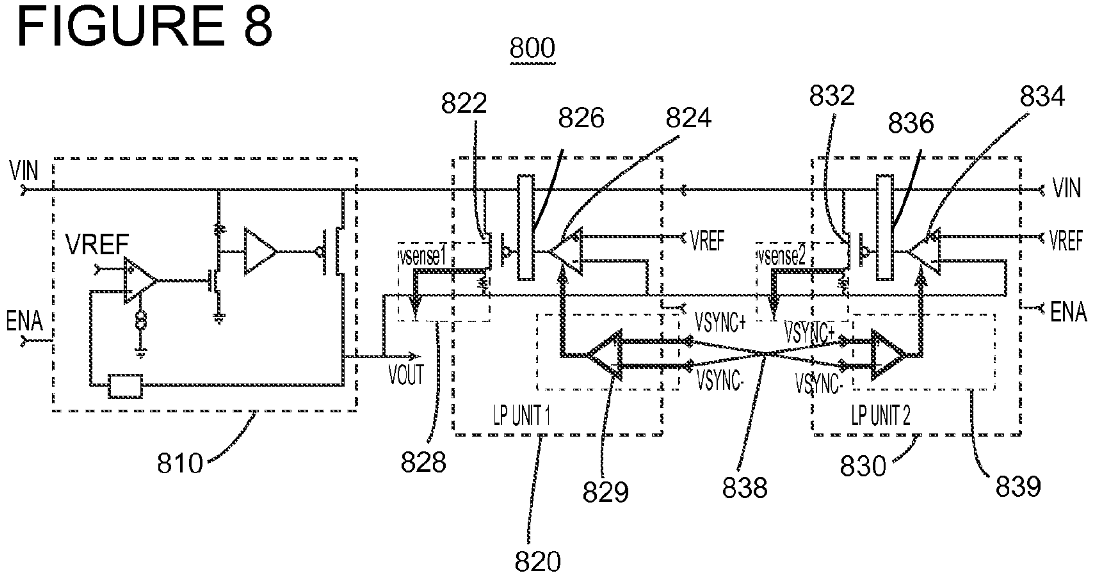
FIG. 8 is a schematic diagram of a source including an LDO regulator and two LP units according to an exemplary embodiment.

FIG. 8 is a schematic diagram of a source 800 that includes an LDO regulator 810 and two LP units, 820 and 830, respectively, according to an exemplary embodiment. First LP unit 820 has a power P-MOS transistor 822, a differential amplifier 824 and an analog synchronization loop 826 that correlate with the first LP current flowing through first LP unit 820 with the LDO current (or the total current) as previously discussed. A similar second LP unit 830 has a power P-MOS transistor 832, a differential amplifier 834 and an analog synchronization loop 836 that correlate with the second LP current flowing through the second LP unit 830 and the LDO current with the LDO current (or the total current).

Each of the first and the second LP units has a secondary synchronization loop for balancing the first LP current and the second LP current. The secondary synchronization loop of the first LP unit 820 includes a sensing part 828 and a balancing part 829. Similarly, the secondary synchronization loop of second LP unit 830 includes a sensing part 838 and a balancing part 839. The sensing outputs of sensing parts 828 and 838 are cross-connected to differential amplifiers in the balancing parts 829 and 839 so that each differential amplifier receives the sensing output from the first LP unit 820 and the sensing output from the second LP unit 830.

Figure 9:
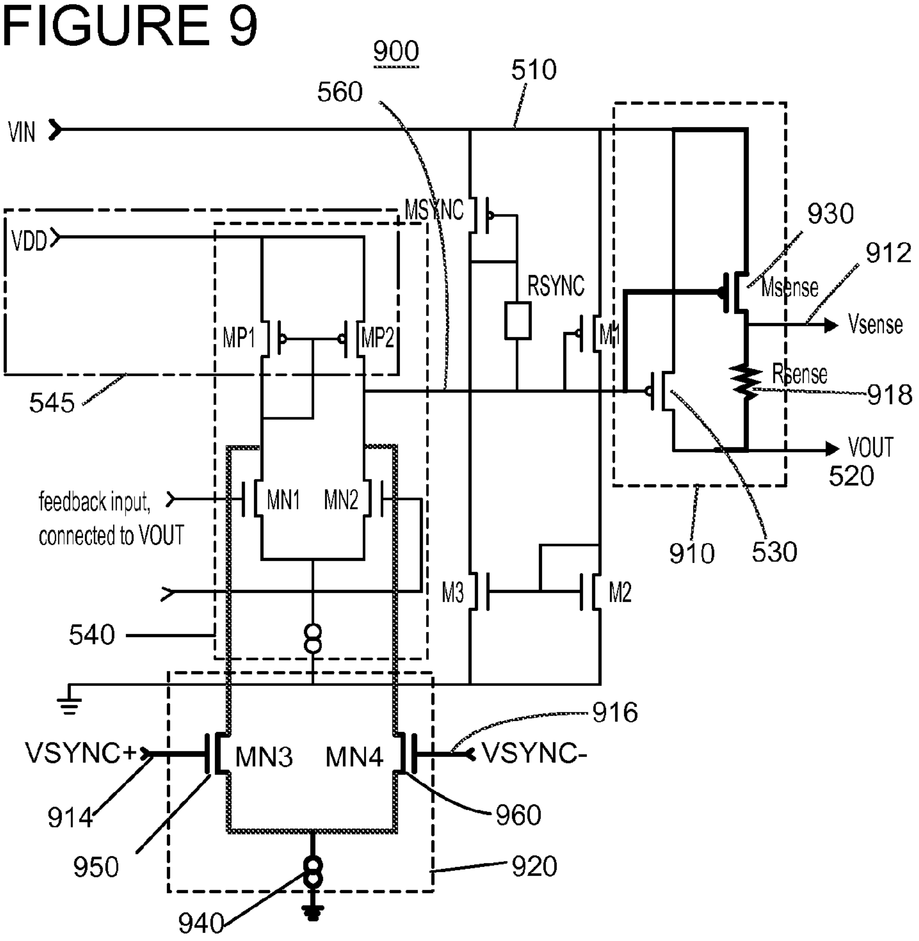
FIG. 9 is a schematic diagram of an LP unit including a secondary synchronization loop according to an exemplary embodiment.

In more detail (which details are merely exemplary and not intended to be limiting), FIG. 9 is a schematic diagram of an LP unit 900 including a secondary synchronization loop in addition to the analog synchronization loop according to an exemplary embodiment. The secondary synchronization loop of LP unit 900 includes a sensing part 910 and a balancing part 920. The secondary synchronization loop of LP unit 900 adds to the LP unit a sensing output 912, a first sensing input 914 and a second sensing input 916.

Sensing part 910 includes a sense P-MOS transistor 930 having a source terminal connected to the input connector 510, a gate terminal connected to the connection 560 between the differential amplifier 540 and the gate terminal of the power P-MOS transistor 530, and a drain terminal connected to the sensing output 912. Sensing part 910 also includes a sensing resistor 918 connected between the sensing output 912 and the output connector 520.

Balancing part 920 is a secondary differential amplifier receiving signals from sensing output 912 and a sensing output of another LP unit, at the first sensing input 914 and the second sensing input 916 therein. The output of the secondary differential amplifier is connected to connection 560.

The secondary differential amplifier may include a secondary current source 940 connected to the ground reference, a first secondary differential amplifier N-MOS transistor 950, and a second secondary differential amplifier N-MOS transistor 960. The first secondary differential amplifier N-MOS transistor 950 is connected to the secondary current source 940 and to the active load 545, and has a gate terminal connected to the first sensing input 914. The second secondary differential amplifier N-MOS transistor 960 is connected to the secondary current source 940 and to the connection 560, and has a gate terminal connected to the second sensing input 916.

The output current sensing is used to balance the offsets so as to have equal currents in each LP unit. Thus, for example, the first sensing input 914 ($V_{SYNC}$) receives signal from the sensing output 912 ($V_{SENSE1}$), and the second sensing input 916 ($V_{SYNC\_}$) receives signal from the sensing output of another LP unit ($V_{SENSE2}$). Similarly, a first sensing input of the other LP unit receives signal from the sensing output of the other LP unit ($V_{SENSE2}$), and a second sensing input of the other LP unit receives signal from the sensing output 912 ($V_{SENSE1}$). Across the sense P-MOS transistor ($M_{SENSE}$) flows a current $A*I_{UNIT}$. Due to the high gain of the secondary differential amplifier, $V_{SENSE1}=V_{SENSE2}$ so that $R_{SENSE1}*A*I_{UNIT1}=R_{SENSE2}*A*I_{UNIT2}$. If $R_{SENSE1}=R_{SENSE2}$ (likely, since the LP units are essentially the same) then $I_{UNIT1}=I_{UNIT2}$, which indicates a current synchronization between the two LP units. LP unit 900 may be used without being in parallel with another LP unit by connecting the sensing inputs to the ground and leaving the sensing output unconnected.

Figure 10:
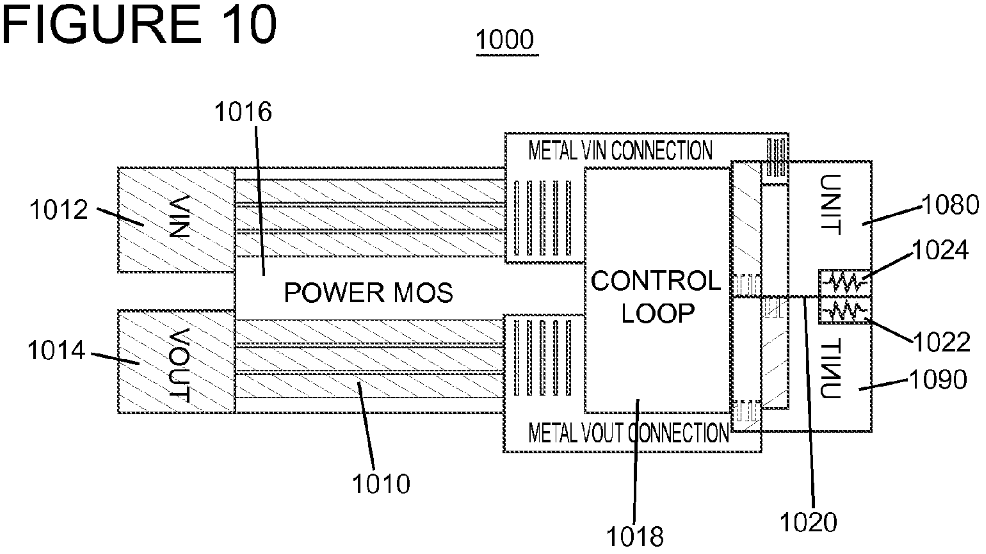
FIG. 10 is a layout of a source including an LDO regulator and two LP units according to an exemplary embodiment.

According to another embodiment, a low-dropout-regulator integrated circuit (LDOIC) may be configured to receive two LP units. FIG. 10 is a layout of a source 1000 including an LDOIC 1010 and two LP units 1080 and 1090 according to an exemplary embodiment. LDOIC 1010 includes an input connector 1012, an output connector 1014, a power MOS transistor 1016 connected between the input connector and the output connector, a control circuit 1018 configured to drive the power MOS transistor 1016, and a low-power-unit connection area 1020.

The low-power-unit connection area 1020 is configured to receive two LP units that may be connected between the input connector and the output connector. However, the source may operate also when a single LP unit or no LP unit is connected. The low-power-unit connection area 1020 includes sense resistors 1022 and 1024, configured to enable synchronization between two connected LP units to output substantially the same current, and LP units 1080 and 1090 are arranged symmetrically relative to a central axis therein.

Figure 11:
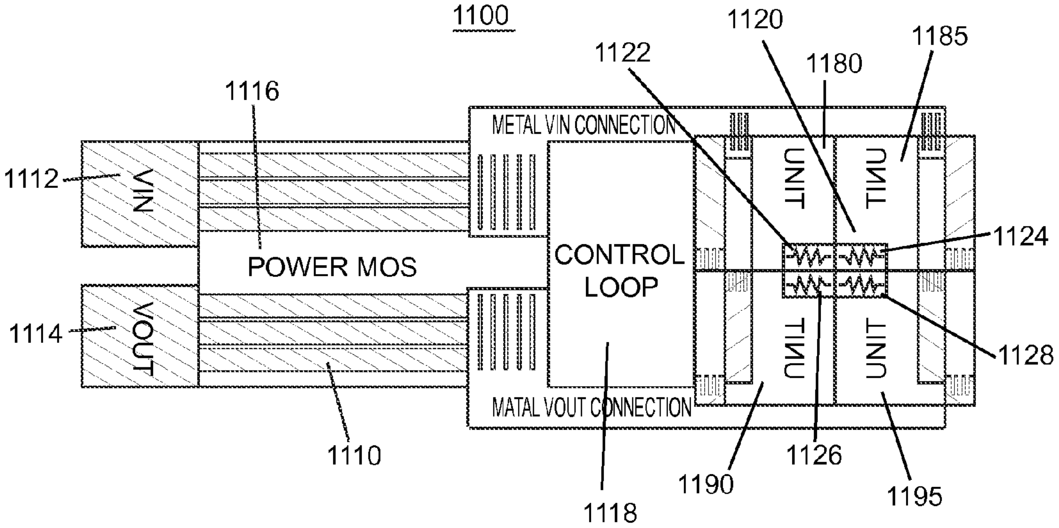
FIG. 11 is a layout of a source including an LDO regulator and four LP units according to an exemplary embodiment.

According to yet another embodiment, a LDOIC may be configured to receive up to four LP units. FIG. 11 is a layout of a source 1100 including an LDOIC 1110 and four LP units 1180, 1185, 1190 and 1195 according to an exemplary embodiment. LDOIC 1110 includes an input connector 1112, an output connector 1114, a power MOS transistor 1116 connected between the input connector and the output connector, a control circuit 1118 configured to drive the power MOS transistor 1116 and a low-power-unit connection area 1120.

The low-power-unit connection area 1120 is configured to receive four LP units connected between the input connector and the output connector. However, source 1100 may operate also when a single LP unit, no LP unit or two LP units are connected. The low-power-unit connection area 1120 includes sense resistors 1122, 1224, 1226 and 1128, configured to enable synchronization between the connected LP units so they output substantially same current. The LP units may be arranged symmetrically relative to the center of the low-power-unit connection area 1120. The placement of the resistors is made such that to achieve the best matching regardless whether one, two or four LP units are used.

Figure 12:
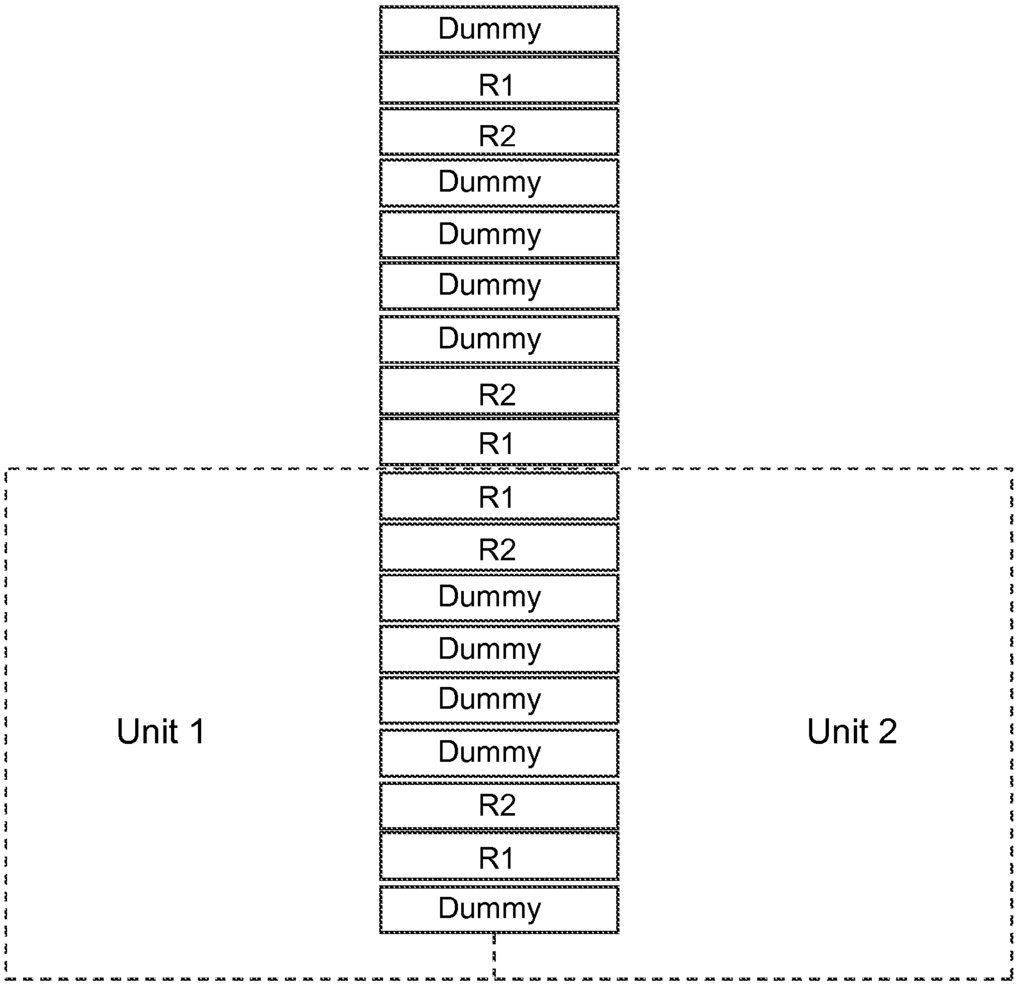
FIG. 12 is a layout detail for a source including an LDO regulator that accommodates two LP units according to an exemplary embodiment.
Figure 13:
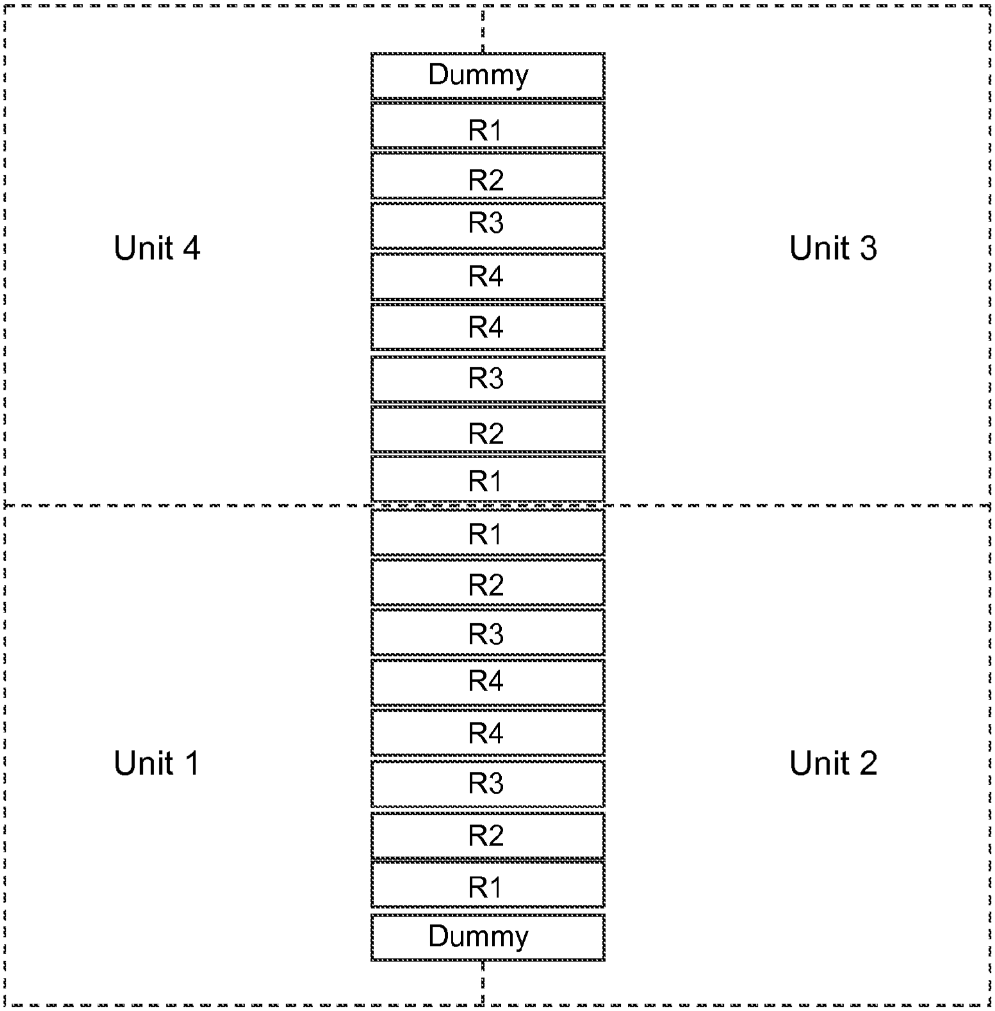
FIG. 13 is a layout detail for a source including an LDO regulator that accommodates four LP units according to an exemplary embodiment.
Figure 14:
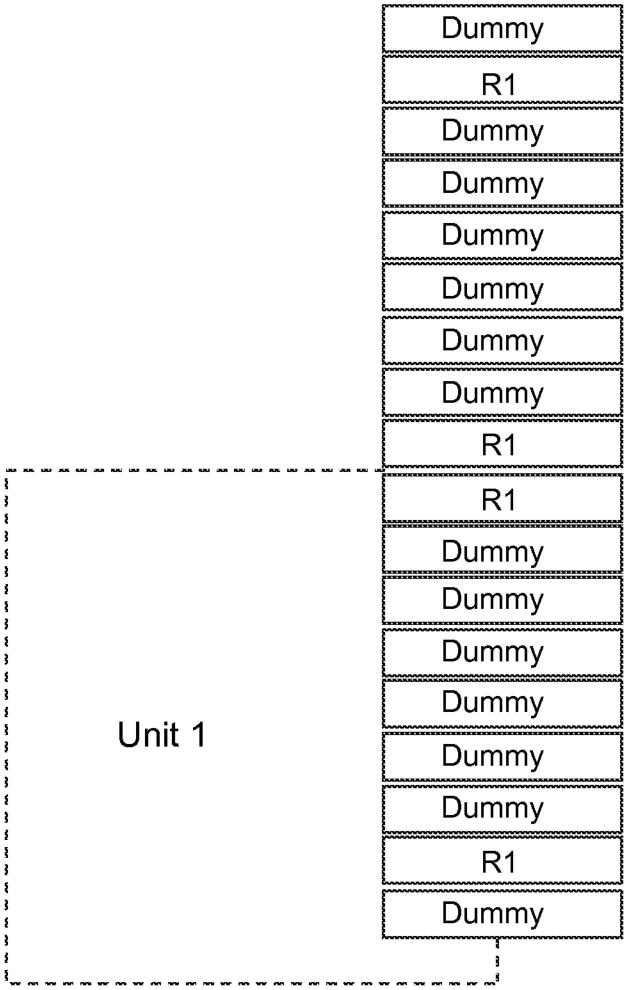
FIG. 14 is a layout detail for a source including an LDO regulator that accommodates a single LP unit according to an exemplary embodiment.

The sensing resistors may be implemented inside a common centroid matrix for best matching as illustrated in FIGS. 12, 13 and 14. The resistor matrix is made of unitary resistors that can be connected either to ($M_{SENSE}$, $V_{SENSE}$) or shorted to (gnd,gnd) just by changing four via connections (e.g., using a grounded guard ring in a physical point of view). In the case of two LP units as illustrated in FIG. 12, sensing resistors R1 and R2 are used and connected, respectively, to ($M_{SENSE1}$, $V_{SENSE1}$) and ($M_{SENSE2}$, $V_{SENSE2}$). Other resistors are shorted to ground and become dummies. The resistors are arranged and connected such that to achieve the best matching in any configuration LDOIC is used (e.g., regardless whether connected to one, two or four LP units).

The setup configured to receive four LP units in FIG. 13 is in essence obtained by flipping vertically the cells for receiving LP units in the embodiment configured to receive two LP units. The resistor matrix, which is perfectly symmetrical, remains identical after flipping. Via connections can then be changed to obtain the R3 and R4 sensing resistors connected, respectively, to ($M_{SENSE3}$, $V_{SENSE3}$) and ($M_{SENSE4}$, $V_{SENSE4}$).

For completion, FIG. 14 is a layout detail for a source including an LDO regulator that accommodates a single LP unit. When switching from two LP units (e.g., FIG. 12) to a single LP unit, R2 resistors are replaced by dummy resistors.

Figure 15:
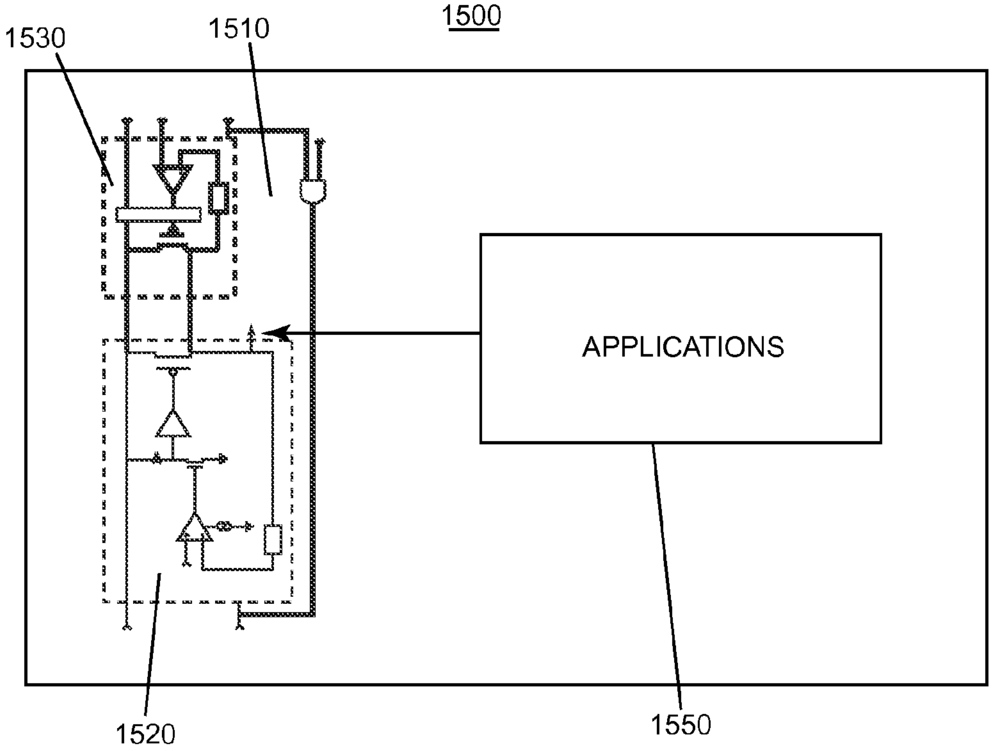
FIG. 15 is a block diagram of a wireless device using a source including an LDO regulator and an LP unit according to an exemplary embodiment.

FIG. 15 is a block diagram of a wireless device 1500 using a source 1500 to provide constant output voltage to applications 1550 according to another exemplary embodiment. Source 1510 includes an LDO regulator 1520 and at least one LP unit 1530. LP unit 1530 may be any of the LP units (e.g., 500, 900) described above.

Figure 16:
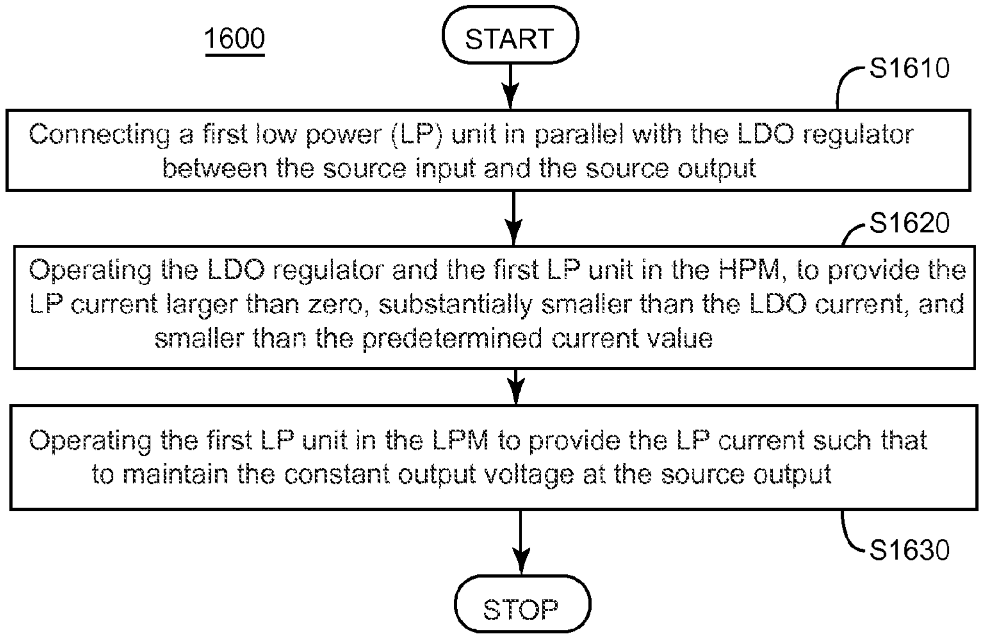
FIG. 16 is a flowchart illustrating steps of a method according to another exemplary embodiment.

FIG. 16 is a flowchart of a method 1600 for providing LPM for a source including a LDO regulator. The LDO regulator is connected between a source input and a source output and is configured (A) to supply a constant output voltage at the source output, in HPM, when a load connected to the source output is larger than or equal to a predetermined load value, and (B) to be turned OFF in LPM, when the load connected to the source output is smaller than the predetermined load value.

Method 1600 includes connecting a first LP unit in parallel with the LDO regulator between the source input and the source output at S1610. Method 1600 further includes operating the LDO regulator and the first LP unit in HPM to provide LP current larger than zero, substantially less than the LDO current, and less than the predetermined current at S1620. Method 1600 also includes operating the first LP unit in LPM to provide LP current so as to maintain constant output voltage at the source output at S1630. The first LP unit may be any of the LP units according to the above-described embodiments. Thus, the first LP unit may includes an input connector configured to connect to the source input, an output connector configured to connect to the source output, a power P-MOS transistor connected between the input connector and the output connector, a differential amplifier driving the power P-MOS transistor, and an analog synchronization loop configured to add a variable voltage offset to the input connector. The differential amplifier receives feedback from the output connector as a first input and a reference signal as a second input.

The variable offset added by the analog synchronization loop depends on a total current at the source output such that, in HPM, an LP current flowing from the input connector to the output connector through the P-MOS is not zero, while being substantially less than LDO current flowing through the LDO regulator, and less than a predetermined current. The variable offset may include a fixed positive shift $v_1$. Fixed positive shift $v_1$ may be such that a sum of the fixed positive shift and an offset between the LDO regulator and the first LP unit is positive for any value of the offset between the LDO regulator and the first LP unit within a predetermined range.

The variable voltage offset may further include a portion that is subtracted from a sum of the fixed positive shift and the offset between the LDO regulator and the first LP unit. This portion that depends on the total current is substantially smaller than the sum, when the total current is less than a predetermined total current value. The portion is larger than the sum when the total current is greater than or equal to the predetermined total current value, thereby determining the LP current to remain less than the predetermined current value.

The use of LP units having analog synchronization loops has at least some of the following advantages:

- it is very flexible, allowing implementation of LPM inside an existing LDO without modifying the LDO for HPM and without using a digital control;
- it is modular versus the current needed in LPM; HPM/LPM transitions are smooth due to analog synchronization; and,
- it is based on an independent LP circuit approach which allows very low power consumption due to its modularity versus the output current need.

Modular LP units according to above-described embodiments may be attached to conventional LDOs without modifying the original high-power mode and without requiring a digital control. This technique provides low risk, cost and complexity for any design upgrade, e.g., for future derivatives of smartphone platforms. For example, using LP units saved about 90 μA current consumption over 300 μA in standby mode of one platform, which represents a 30% savings.

The disclosed exemplary embodiments provide devices and methods for connecting one or more modular low-power units parallel to a LDO regulator to efficiently provide a high-power mode and a low-power mode. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

What is claimed is:

1. A low-power-mode integrated circuit (LPMIC) configured to be connected in parallel with a low-dropout (LDO) regulator that is connected between a source input and a source output, and is configured (A) to supply a constant output voltage, in a high-power mode (HPM), when a load connected to the source output is larger than or equal to a predetermined load value, and (B) to be turned OFF, in LPM, when the load connected to the source output is smaller than the predetermined load value, the LPMIC comprising:

- an input connector configured to be connected to the source input;
- an output connector configured to be connected to the source output;
- a power P-MOS transistor connected between the input connector and the output connector;

a differential amplifier driving the power P-MOS transistor and receiving feedback from the output connector as a first input and a reference signal as a second input; and an analog synchronization loop including a sync P-MOS transistor having a source terminal connected to the input connector, a gate terminal connected to a drain terminal and to a first connector of a current mirror, the gate terminal also being connected to a connection between the differential amplifier and a gate terminal of the power P-MOS transistor via a sync resistor, a first P-MOS transistor having a source terminal connected to the input connector, a gate terminal connected to the connection between the differential amplifier and the gate terminal of the power P-MOS transistor, and a drain terminal connected to a second connector of the current mirror, and the current mirror connected to a ground reference.

2. The LPMIC of claim 1, wherein the sync P-MOS transistor and the first P-MOS transistor have substantially same width and length.

3. The LPMIC of claim 1, wherein the analog synchronization loop yields a variable voltage offset depending on a total current output by the LDO regulator and the power P-MOS transistor at the source output. $(-V_{OS}(Iout)+v_1)$.

4. The LPMIC of claim 1, wherein the sync P-MOS transistor and the first P-MOS transistor operate in weak inversion when a total current output by the LDO regulator and the power P-MOS transistor at the source output is below a predetermined threshold, and in saturation when the total current exceeds the predetermined threshold.

5. The LPMIC of claim 1, wherein the current mirror includes a first N-MOS transistor connected between the second connector of the current mirror and the ground reference, and a second N-MOS transistor connected between the first connector of the current mirror and the ground reference, wherein a gate terminal of the first N-MOS transistor, a gate terminal of the second N-MOS transistor and a source terminal of the second N-MOS transistor are connected together.

6. The LPMIC of claim 1, wherein the differential amplifier includes a current source connected to the ground reference, a first differential amplifier N-MOS transistor connected between the current source and an active load of the differential amplifier, and having a gate terminal connected to the first input of the differential amplifier, and a second differential amplifier N-MOS transistor connected between the current source and the connection between the differential amplifier and the gate terminal of the power P-MOS transistor, the second differential amplifier N-MOS transistor having a gate terminal connected to the second input of the differential amplifier, wherein the active load is connected between a drain terminal of the first differential amplifier N-MOS transistor and the connection between the differential amplifier and the gate terminal of the power P-MOS transistor.

7. The LPMIC of claim 1, further comprising:

a secondary synchronization loop configured to make the LPMIC to output substantially same current as a second LPMIC connected in parallel with the LDO regulator, the secondary synchronization loop including a sensing output;

a first sensing input;

a second sensing input;

a sense P-MOS transistor having a source terminal connected to the input connector, a gate terminal connected to the connection between the differential amplifier and the gate terminal of the power P-MOS transistor, and a drain terminal connected to the sensing output;

a sensing resistor connected between the sensing output and the output connector;

a secondary differential amplifier connected to the first sensing input and to the second sensing input, and having an output terminal connected to the connection between the differential amplifier and the gate terminal of the power P-MOS transistor, wherein the sensing output is connected to the first sensing input and a sensing output of the second LPMIC is connected to the second sensing input.

8. The LPMIC of claim 7, wherein (A) the differential amplifier includes a current source connected to the ground reference, a first differential amplifier N-MOS transistor connected to the current source and an active load of the differential amplifier, and having a gate terminal connected to the first input, and a second differential amplifier N-MOS transistor connected to the current source and the connection between the differential amplifier and the gate terminal of the power P-MOS transistor, and having a gate terminal connected to the second input;

(B) the secondary differential amplifier includes a secondary current source connected to the ground reference, a first secondary differential amplifier N-MOS transistor connected to the secondary current source and to the active load, the first secondary differential amplifier N-MOS transistor having a gate terminal connected to the first sensing input, and a second secondary differential amplifier N-MOS transistor connected to the secondary current source and to the connection, the second secondary differential amplifier N-MOS transistor having a gate terminal connected to the second sensing input; and (C) the active load being connected between a drain terminal of the first differential amplifier N-MOS transistor and the connection between the differential amplifier and the gate terminal of the power P-MOS transistor.

9. A method for providing a low-power mode (LPM) for a source including low-dropout (LDO) regulator that is connected between a source input and a source output and is configured (A) to supply a constant output voltage at the source output, in a high-power mode (HPM), when a load connected to the source output is larger than or equal to a predetermined load value, and (B) to be turned OFF, in LPM, when the load connected to the source output is smaller than the predetermined load value, the method comprising:

connecting a first low-power (LP) unit in parallel with the LDO regulator between the source input and the source output, the first LP unit including an input connector configured to be connected to the source input;

an output connector configured to be connected to the source output;

a power P-MOS transistor connected between the input connector and the output connector;

a differential amplifier driving the power P-MOS transistor, receiving feedback from the output connector as a first input and a reference signal as a second input; and an analog synchronization loop configured to add a variable voltage offset to the input connector, the variable offset depending on a total current at the source output such that, in HPM, an LP current flowing from the input connector to the output connector through the P-MOS is not zero, while being substantially smaller than an LDO current flowing through the LDO regulator, and smaller than a predetermined current;

operating the LDO regulator and the first LP unit in HPM, to provide the LP current larger than zero, substantially smaller than the LDO current, and smaller than the predetermined current; and operating the first LP unit in LPM to provide the LP current such that to maintain the constant output voltage at the source output.

10. The method of claim 9, wherein the variable voltage offset includes a fixed positive shift $v_1$.

11. The method of claim 10, wherein the fixed positive shift is such that a sum of the fixed positive shift and an offset between the LDO regulator and the first LP unit is positive for any value of the offset between the LDO regulator and the first LP unit within a predetermined range.

12. The method of claim 11, wherein the variable voltage offset further includes a portion that is subtracted from a sum of the fixed positive shift and the offset between the LDO regulator and the first LP unit, the portion being (A) substantially smaller than the sum, when the total current is smaller than a predetermined total current value, and (B) larger than the sum, when the total current is larger than or equal to the predetermined total current value, thereby determining the LP current to remain smaller than the predetermined current value.

13. The method of claim 9, wherein the analog synchronization loop includes a sync P-MOS transistor having a source terminal connected to the input connector, a gate terminal connected to a drain terminal and to a first connector of a current mirror, the gate also being connected to a connection between the differential amplifier and a gate terminal of the power P-MOS transistor via a sync resistor, a first P-MOS transistor having a source terminal connected to the input connector, a gate terminal connected to the connection between the differential amplifier and the gate terminal of the power P-MOS transistor, and a drain terminal connected to a second connector of the current mirror, and the current mirror connected to a ground reference.

14. The method of claim 13, wherein the sync P-MOS transistor and the first P-MOS transistor have substantially same width and length.

15. The method of claim 13, wherein the sync P-MOS transistor and the first P-MOS transistor operate in weak inversion mode when a total current output by the LDO regulator and by the power P-MOS transistor at the source output is below a predetermined threshold, and operate in saturation mode when the total current exceeds the predetermined threshold.

16. The method of claim 13, wherein the current mirror includes a first N-MOS transistor connected between the second connector of the current mirror and the ground reference, and a second N-MOS transistor connected between the first connector of the current mirror and the ground reference, wherein a gate terminal of the first N-MOS transistor, a gate terminal of the second N-MOS transistor and a source of the second N-MOS transistor are connected together.

17. The method of claim 13, wherein the differential amplifier includes a current source connected to the ground reference, a first differential amplifier N-MOS transistor connected to the current source and an active load of the differential amplifier, and having a gate terminal connected to the first input, and a second differential amplifier N-MOS transistor connected to the current source and the connection between the differential amplifier and the gate terminal of the power P-MOS transistor, and having a gate terminal connected to the second input, wherein the active load is connected between a drain terminal of the first differential amplifier N-MOS transistor and the connection between the differential amplifier and the gate terminal of the power P-MOS transistor.

18. The method of claim 13, further comprising:

connecting a second low-power (LP) unit in parallel to the first LP unit, the second LP unit being similar to the first LP unit; and synchronizing the first LP unit and the second LP unit to output substantially equal currents.

19. The method of claim 18, wherein each of the first LP unit and the second LP unit has a secondary synchronization loop configured achieve the synchronizing, the secondary synchronization loop including a sense P-MOS transistor having a source terminal connected to the input connector, a gate terminal connected to the connection between the differential amplifier and the gate terminal of the power P-MOS transistor, and a drain terminal connected to the output connector via a sense resistor, and a secondary differential amplifier receiving a first input from a connection between the sense P-MOS transistor and the sense resistor, a second input from a similar connection between another sense P-MOS transistor in the second LPMIC and another sense resistor in the second LPMIC, the secondary differential amplifier having an output connected to the connection between the differential amplifier and the gate terminal of the power P-MOS transistor.

20. A low-dropout-regulator integrated circuit (LDOIC), comprising:

an input connector;

an output connector;

a power MOS transistor connected between the input connector and the output connector;

a control circuit configured to drive the power MOS transistor; and a low-power-unit connection area configured to receive at least two low-power (LP) units to be connected between the input connector and the output connector, the low-power-unit connection area including sense resistors, configured to enable synchronization between two connected LP units to output substantially same current, wherein each LP unit includes an input connector configured to be connected to the source input;

an output connector configured to be connected to the source output;

a power P-MOS transistor connected between the input connector and the output connector;

a differential amplifier driving the power P-MOS transistor, receiving feedback from the output connector as a first input and a reference signal as a second input;

an analog synchronization loop including a sync P-MOS transistor having a source terminal connected to the input connector, a gate terminal connected to a drain terminal and to a first connector of a current mirror, the gate terminal also being connected to a connection between the differential amplifier and a gate terminal of the power P-MOS transistor via a sync resistor, a first P-MOS transistor having a source terminal connected to the input connector, a gate terminal connected to the connection between the differential amplifier and the gate terminal of the power P-MOS transistor, and a drain terminal connected to a second connector of the current mirror, and the current mirror connected to a ground reference; and a secondary synchronization loop including a sensing output, a first sensing input connected to the sensing output, a second sensing input connected to and a sensing output of another LP unit, a sense P-MOS transistor having a source terminal connected to the input connector, a gate terminal connected to the connection between the differential amplifier and the gate terminal of the power P-MOS transistor, and a drain terminal connected to the sensing output, and a secondary differential amplifier connected to the first sensing input and to the second sensing input, and having an output terminal connected to the connection between the differential amplifier and the gate terminal of the power P-MOS transistor, wherein one of the sensing resistors in the low-power-unit connection area is connected between the sensing output and the output connector.

21. The LDOIC of claim 20, wherein the sense resistors are implemented inside a common centroid matrix.

22. The LDOIC of claim 20, wherein the low-power-unit connection area is configured symmetrical to a center terminal.

23. The LDOIC of claim 20, wherein, if no LP unit is connected to a sense resistor in the low-power unit-connection area, the sense output is unconnected and the sensing inputs are connected to the ground.

24. The LDOIC of claim 20, wherein the low-power-unit connection area is configured to receive four LP units.

25. A wireless device, comprising:

a source having a low-dropout (LDO) regulator that is connected between a source input and a source output and is configured (A) to supply a constant output voltage, in a high-power mode (HPM), when a load connected to the source output is larger than or equal to a predetermined load value, and (B) to be turned OFF, in LPM, when the load connected to the source output is smaller than the predetermined load value; and at least one low-power (LP) unit configured to be connected in parallel with the LDO regulator, and comprising:

an input connector configured to be connected to the source input;

an output connector configured to be connected to the source output;

a power P-MOS transistor connected between the input connector and the output connector;

a differential amplifier driving the power P-MOS transistor, receiving feedback from the output connector as a first input and a reference signal as a second input; and an analog synchronization loop including a sync P-MOS transistor having a source terminal connected to the input connector, a gate terminal connected to a drain terminal and to a first connector of a current mirror, the gate terminal also being connected to a connection between the differential amplifier and a gate terminal of the power P-MOS transistor via a sync resistor, a first P-MOS transistor having a source terminal connected to the input connector, a gate terminal connected to the connection between the differential amplifier and the gate terminal of the power P-MOS transistor, and a drain terminal connected to a second connector of the current mirror, and the current mirror connected to a ground reference.

* * * * *